United States Patent [19]
Gabus

[11] 3,832,570
[45] Aug. 27, 1974

[54] METHOD FOR CONTROLLING AT LEAST ONE LOAD CIRCUIT AND DEVICES FOR CARRYING OUT THIS METHOD

[75] Inventor: Jean-Claude Gabus, Schilern/Koniz, Switzerland

[73] Assignee: Signale & Automatik A.G., Berne, Switzerland

[22] Filed: Dec. 5, 1972

[21] Appl. No.: 312,316

[30] Foreign Application Priority Data
Jan. 28, 1972  Switzerland.......................... 1380/72

[52] U.S. Cl................................. 307/116, 340/407
[51] Int. Cl. ........................................... H01h 3/16
[58] Field of Search..................... 307/11, 200, 116; 200/61.04, 61.05, 61.01, 61.02, DIG. 2, 52, DIG. 1, 61.58, DIG. 2; 340/235, 365 R, 407, 168 B, 168 S; 128/409, 2.1 R

[56] References Cited
UNITED STATES PATENTS

| | | | |
|---|---|---|---|
| 2,769,872 | 11/1956 | Clark | 200/61.05 |
| 2,782,308 | 2/1957 | Rug | 200/DIG. 1 |
| 3,111,608 | 11/1963 | Boenning et al. | 200/DIG. 1 |
| 3,122,731 | 2/1964 | Hutchison | 340/407 X |
| 3,277,892 | 10/1966 | Tepper | 128/409 X |
| 3,412,292 | 11/1968 | Forbes | 307/116 X |
| 3,651,512 | 3/1972 | Summers | 340/325 |
| 3,705,424 | 12/1972 | Harvey | 200/DIG. 2 |

*Primary Examiner*—Robert K. Schaefer
*Assistant Examiner*—M. Ginsburg
*Attorney, Agent, or Firm*—Young & Thompson

[57] ABSTRACT

The invention concerns a method for controlling at least one load circuit, where the switching on of this load circuit is controlled by means of a control circuit actuated by at least one detector which is actuated with the tongue. The invention concerns also a control device for at least one load circuit which comprises a relay one contact of which is connected into the load circuit to be controlled and also a circuit for controlling this relay actuated by at least one humidity-sensitive detector intended to be actuated with the tongue.

4 Claims, 3 Drawing Figures

METHOD FOR CONTROLLING AT LEAST ONE LOAD CIRCUIT AND DEVICES FOR CARRYING OUT THIS METHOD

The present invention has as its object a control method and device for handicapped persons, permitting notably the closure of at least one electrical load circuit, capable of being actuated even by extremely physically handicapped persons, for example such as paralysed persons.

The present invention has as its object a method for operating at least one load circuit, characterised by the fact that the switching on of this load circuit is controlled by means of a control circuit actuated by at least one detector which is actuated with the tongue.

The present invention also has as object a device for carrying out this method which is distinguished by the fact that it comprises a relay, one contact of which is connected into the load circuit to be controlled as well as a circuit for controlling this relay actuated by at least one humidity-sensitive detector and intended to be actuated with the tongue.

The attached drawing shows diagrammatically, and as an example, one form of execution of the control device according to the invention.

Figure 2:
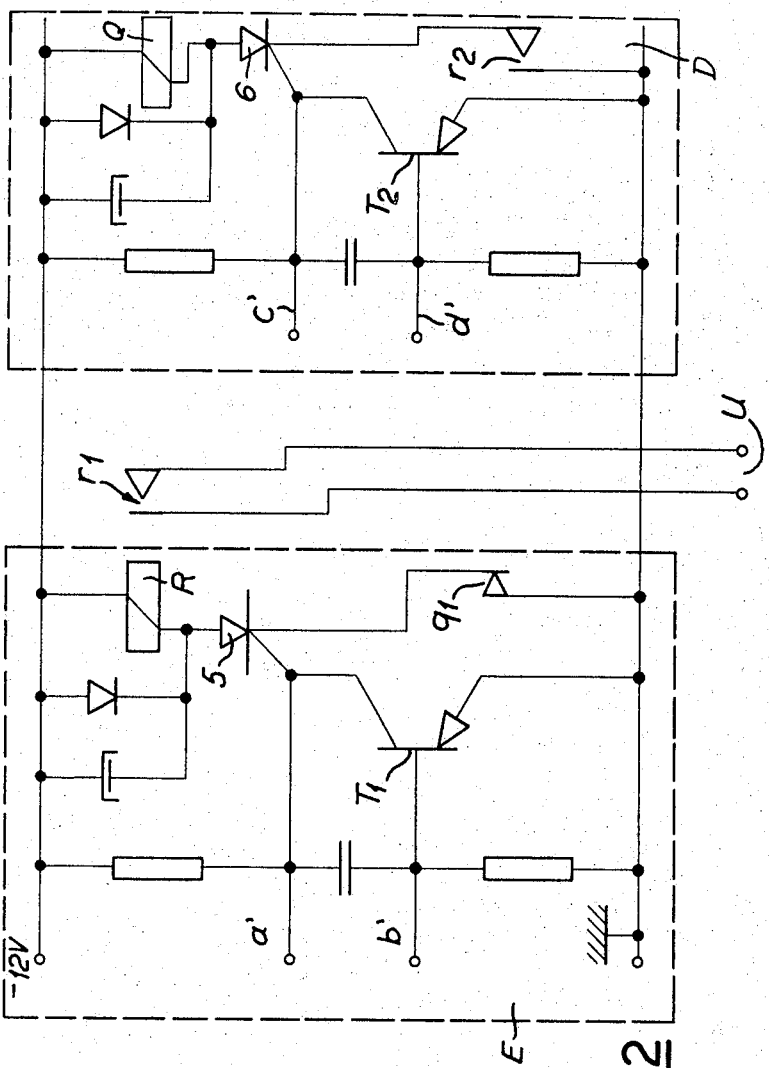
FIG. 2 shows one form of embodiment of an excitation and de-excitation circuit of a relay acting on the load circuit.
Figure 1:
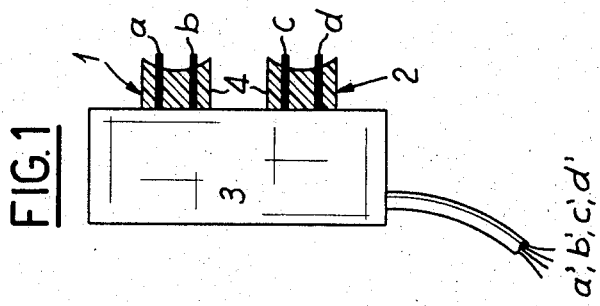
FIG. 1 shows diagrammatically and partly in section the detector of the control device.

Experience has shown that physically handicapped, seriously paralysed and paraplegic persons etc., even when they are very seriously afflicted and can no longer move their limbs, can often still control the movements of their tongue.

Thus, it is an objective of the method of the present invention to permit the control of an electrical load circuit by means of a detector capable of being actuated by the tongue of a patient.

The control device illustrated for carrying out the method comprises two detectors 1, 2 mounted on a housing 3 of moderate dimensions capable of being carried on a support of the microphone type or the like, so that it can be placed in immediate proximity to the mouth of a patient.

Each of these detectors comprises two contacts $a$, $b$; $c$, $d$, embedded in an insulating material 4 and having their ends projecting from this material. The size and arrangements of these detectors and of their contacts are such that a patient is able to touch the two contacts of a single detector simultaneously with the tip of his tongue.

An electrical cable connects the housing 3 to the other part of the control device, the control circuit comprising an excitation circuit E and de-excitation circuit D for a relay R, one contact $r_1$ of which is arranged in a load circuit U.

The excitation circuit for the relay R comprises terminals $a'$, $b'$, connected respectively to the contacts $a$, $b$ of the detector 1, these terminals being mounted in a voltage divider formed by two resistors connected between each of these terminals and earth and a negative voltage of $-12V$, respectively. These terminals are decoupled by a condenser to prevent parasitic oscillations in the circuit.

The terminal $a'$ is connected to the collector of a transistor $T_1$, while the terminal $b'$ is connected to the base of this same transistor $T_1$, the emitter of the transistor $T_1$ being connected to earth.

The collector of the transistor $T_1$ controls, through the intermediary of a thyristor 5, the excitation of the relay R. A contact $q_1$ of a relay Q of the de-excitation circuit D connects the anode of the thyristor 5 to earth and is normally closed.

The de-excitation circuit for the relay R comprises terminals $c'$, $d'$ connected respectively to the contacts $c, d$, of the detector 2, these terminals being mounted in a voltage divider formed by two resistors connected between each of these terminals and earth and a negative voltage of $-12V$, respectively. These terminals are also decoupled by a condenser.

The terminal $c'$ is connected to the collector of a transistor $T_2$, while the terminal $d'$ is connected to the base of this transistor, the emitter of the transistor $T_2$ being connected to earth.

The collector of this transistor $T_2$ controls, through the intermediary of a thyristor 6, the relay Q. A contact $r_2$ normally open, of the relay R connects the anode of the thyristor 6 to earth.

The functioning of the device described is as follows; let us suppose that initially its state is as shown in the drawing that is to say, the two relays R and Q are de-energised, that is, the two contacts $r_1$ and $r_2$ are normally open while the contact $q_1$ is normally closed. The load circuit U is thus interrupted.

When the patient places the tip of his tongue against the front face of the detector 1, the humidity of his tongue produces an electrical contact between the contacts $a$ and $b$, causing conduction of the normally blocked transistor $T_1$. The conduction of the transistor $T_1$ gives a current pulse to the thyristor 5, causing it to be switched on and the relay R to be thereby energised. The relay R being energised, its contacts $r_1$ and $r_2$ close, causing in the first place the closing of the load circuit U and secondly the preparation of the de-energising circuit D. Only an instantaneous action is therefore needed on the detector 1 to cause the permanent closure of the load circuit U, the thyristor 5 remaining switched on once the current pulse has been given. It should also be noted that if the patient applies his tongue a number of times in succession to the detector 1, the first current pulse produced in this way causes the thyristor to be switched on and this thyristor then remains switched on so that the subsequent applications of his tongue are without effect on the control of the load circuit U.

When the patient desires to interrupt the load circuit U, he applies his tongue to the detector 2, thus connecting electrically its two contacts $c$ and $d$, which leads to conduction of the transistor $T_2$. The conduction of this transistor $T_2$ delivers a current to the thyristor 6, which switches this thyristor on thus causing energising of the relay Q and thereby the opening of the normally closed contact $q_1$. The opening of this contact $q_1$ causes switching off of the thyristor 5 and, as a consequence of this, de-energising of the relay R. Since the contacts $r_1$ and $r_2$ are thereby opened, the load circuit is interrupted and energising of the relay Q is also interrupted, which causes the contact $q_1$ to return to the closed position thus bringing the control device back to its initial rest condition.

It is quite clear that it is possible to multiply the number of load circuits operating by means of the method described. It is in fact necessary to provide only two detectors and their associated excitation and de-excitation circuits for each load circuit.

When it is desired to operate a large number of load circuits and it is impossible from a practical point of view to combine the corresponding number of detectors in a housing 3 which is sufficiently small for all these detectors to be capable of being reached by the patient using his tongue, without moving his head, it is possible to provide a logic block inserted between the housing 3 and the excitation and de-excitation circuits. Indeed, by using a coding obtained by a simple logic based upon known principles it is possible to short-circuit the terminals $a'$, $b'$, or $c'$, $d'$ of a given control circuit solely in response to a succession of impulses emitted from a single detector or different detectors.

The load circuit U may, in the example illustrated, be the electrical supply circuit to a radio, a lamp, a television set, or an electric motor operating, for example, window blinds or even a miniaturised electric train.

Figure 3:
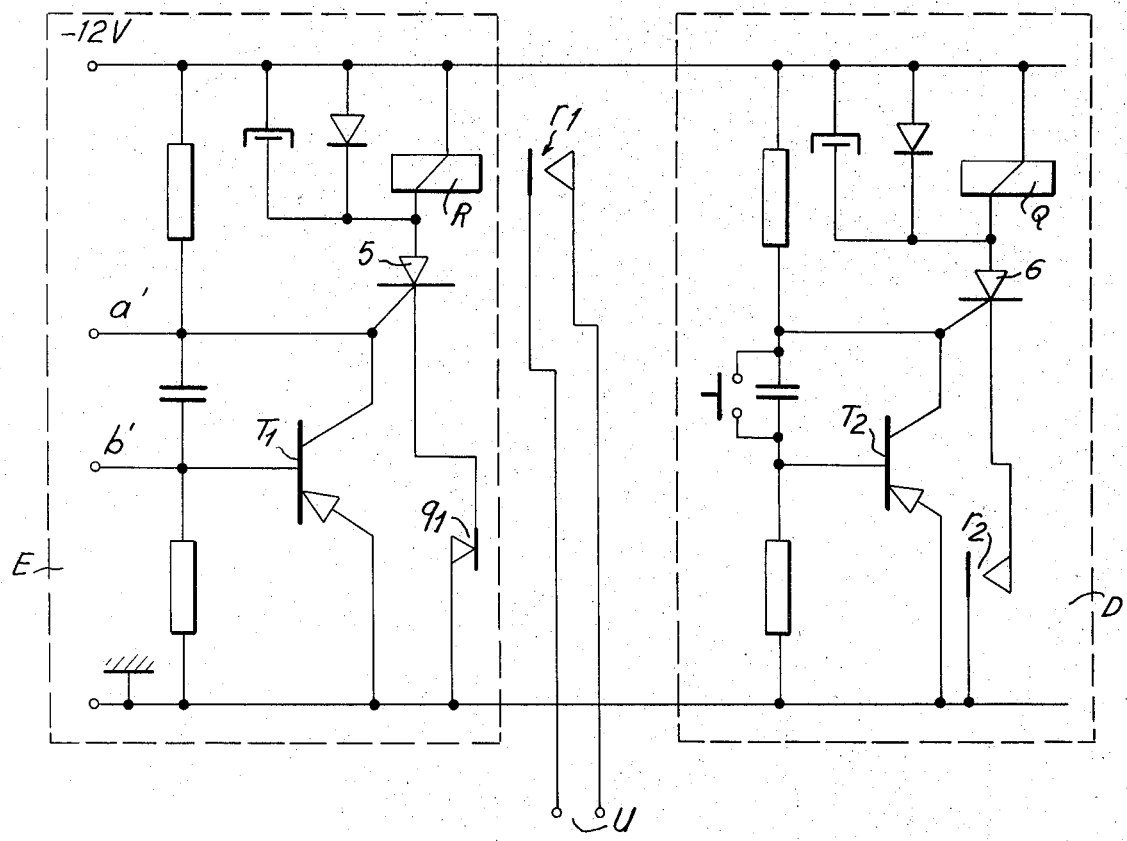
FIG. 3 is similar to FIG. 2 but shows another form of embodiment.

Another case, which is very frequent and necessary in hospitals and clinics, consists of enabling the patient to call a nurse. In this particular case, the control device is reduced to a single detector 1 with its associated excitation circuit E constituting the control circuit, since the nurse will switch off the call manually when she arrives. This can be effected for example by instantaneously opening the contact $q_1$, which would then be constituted by a push-button switch as shown for example in FIG. 3.

It is quite evident that numerous electrical layouts may be designed for controlling a load circuit by means of a detector such as described, and it is thus solely as an explanatory example that one particular form of embodiment of these circuits has been given. The essential and primary character of the method and device described reside in the concept of a small-size detector capable of being actuated by the tongue of a person.

Finally, it is clear that the supply voltage of the control device may be produced either form the mains or from accumulators or batteries.

I claim:

1. A tongue-controlled device for at least one load circuit, comprising a relay having a contact connected into the load circuit to be controlled, an energizing circuit for activating said relay upon instant closure thereof, means for actuating said energizing circuit, said actuating means comprising a pair of exposed contacts spaced apart a distance sufficiently small to be bridged by the human tongue, means responsive to bridging said contacts by the human tongue to close said energizing circuit at the instant of said bridging of said contacts, a deenergizing circuit for de-activitating said relay, means for actuating said de-energizing circuit, and means retaining said energizing circuit actuated until said deenergizing circuit is actuated.

2. A tongue-controlled device as claimed in claim 1, said actuating means for said de-energizing circuit comprising a further pair of exposed contacts placed apart a distance sufficiently small to be bridged by a human tongue.

3. A tongue-controlled device as claimed in claim 2, the two said pairs of exposed contacts being mounted side by side embedded in insulating material and having their ends projecting from the insulating material.

4. A tongue-controlled device as claimed in claim 1, said actuating means for said de-energizing circuit comprising a manual interrupter enabling said relay to be de-energized.

* * * * *